United States Patent
Shaw

(10) Patent No.: US 7,546,712 B2
(45) Date of Patent: Jun. 16, 2009

(54) SYSTEM OF STACKED CONCRETE BLOCKS, EACH BLOCK HAVING A TIRE WALL STACK THEREWITHIN SURROUNDING A HOLLOW CORE THROUGH WHICH A VERTICAL REINFORCING MEMBER EXTENDS AND REINFORCING BARS IN MORTAR IN VOID BETWEEN ADJACENT BLOCKS

(76) Inventor: Reece F. Shaw, 1 Sierra Ct., Tiburon, CA (US) 94920

( * ) Notice: Subject to any disclaimer, the term of this patent is extended or adjusted under 35 U.S.C. 154(b) by 657 days.

(21) Appl. No.: 11/105,170

(22) Filed: Apr. 13, 2005

(65) Prior Publication Data

US 2005/0257481 A1 Nov. 24, 2005

Related U.S. Application Data

(60) Provisional application No. 60/561,702, filed on Apr. 13, 2004.

(51) Int. Cl.
*E04B 2/18* (2006.01)
*E04B 2/20* (2006.01)
*E04C 1/41* (2006.01)

(52) U.S. Cl. ............... 52/223.8; 52/439; 52/592.6; 52/600; 52/606

(58) Field of Classification Search ............ 52/596, 52/600, 585.1, 606, 223.8, 439, 592.6; 405/286
See application file for complete search history.

(56) References Cited

U.S. PATENT DOCUMENTS

| | | | | |
|---|---|---|---|---|
| 1,607,583 A | * | 11/1926 | Bader | 52/439 |
| 2,176,986 A | * | 10/1939 | Briscoe | 52/293.2 |
| 3,733,675 A | | 5/1973 | Diederich | |
| 3,842,606 A | | 10/1974 | Stiles et al. | |
| 3,934,540 A | * | 1/1976 | Bruner et al. | 116/63 P |
| 4,057,141 A | | 11/1977 | Laurie et al. | |
| 4,080,793 A | | 3/1978 | Pulsifer | |
| 4,139,319 A | | 2/1979 | Anderson | |
| 4,288,175 A | | 9/1981 | Baker et al. | |
| 4,658,541 A | | 4/1987 | Haile | |
| 4,785,577 A | * | 11/1988 | Lederbauer | 47/33 |
| 4,804,294 A | | 2/1989 | Barthel | |
| 4,996,813 A | * | 3/1991 | Kliethermes et al. | 52/592.1 |
| 4,997,309 A | | 3/1991 | Kiselewski | |
| 5,006,014 A | * | 4/1991 | Greenough | 405/72 |
| 5,024,560 A | * | 6/1991 | Reilly | 405/303 |

(Continued)

*Primary Examiner*—Gay Ann Spahn
(74) *Attorney, Agent, or Firm*—Christie, Parker & Hale, LLP.

(57) ABSTRACT

An article of manufacture for building concrete structures from precast blocks and the process for making the structural system. The block comprises one or more annular tire wall stack units embedded in reinforced concrete. Prestressing and/or post-tensioning structural reinforcing techniques are used with assembled building blocks. The blocks are made by placing used tire stacks in a form that centralizes the stacks so that reinforced concrete can be placed around them while maintaining a hollow core through the stacks. Horizontal interlocking between blocks uses reinforcing bars and/or a tongue and groove configuration, and/or post-tension wire strand placed in a recess or post-tension tubes formed in the blocks and mortared in-place during construction. Vertical interlocking between blocks uses a tongue-and-groove interlock, shiplap splicing, and reinforcing bars. Post-tension wire strand, pipe, or H-piles are placed in and through the stacks and mortared in-place during construction.

4 Claims, 12 Drawing Sheets

U.S. PATENT DOCUMENTS

| | | | |
|---|---|---|---|
| 5,092,076 A | 3/1992 | Terreta | |
| 5,103,616 A | 4/1992 | Nordberg | |
| 5,121,680 A | 6/1992 | Nordberg | |
| 5,143,484 A * | 9/1992 | Deul | 405/288 |
| 5,172,528 A | 12/1992 | Clarke | |
| 5,214,896 A * | 6/1993 | Hamilton | 52/563 |
| 5,214,897 A * | 6/1993 | Nordberg | 52/585.1 |
| 5,279,216 A | 1/1994 | Nordberg | |
| 5,367,007 A * | 11/1994 | Richards | 524/59 |
| 5,370,475 A | 12/1994 | LeBlanc | |
| 5,378,088 A | 1/1995 | Foehrkolb | |
| 5,380,124 A | 1/1995 | Cacossa et al. | |
| 5,400,561 A | 3/1995 | Metten | |
| 5,485,703 A * | 1/1996 | Nordahl | 52/562 |
| 5,507,127 A * | 4/1996 | Gates | 52/605 |
| 5,746,037 A | 5/1998 | Nordberg | |
| 5,778,622 A | 7/1998 | Baker | |
| 5,795,106 A * | 8/1998 | Herd | 405/284 |
| 5,863,483 A * | 1/1999 | Tom et al. | 264/274 |
| 5,915,880 A | 6/1999 | Nordberg | |
| 5,942,306 A * | 8/1999 | Tom et al. | 428/76 |
| 6,161,357 A * | 12/2000 | Altemus | 52/592.6 |
| 6,244,009 B1 * | 6/2001 | Cerrato | 52/604 |
| 6,401,420 B1 * | 6/2002 | Salls | 52/600 |
| 6,428,691 B1 * | 8/2002 | Wofford | 210/151 |
| 6,758,020 B2 * | 7/2004 | Cerrato | 52/606 |
| 2003/0156908 A1 * | 8/2003 | Liaw | 405/284 |
| 2005/0257478 A1 * | 11/2005 | Callinan | 52/576 |
| 2008/0161628 A1 * | 7/2008 | Jo | 588/3 |

* cited by examiner

SYSTEM OF STACKED CONCRETE BLOCKS, EACH BLOCK HAVING A TIRE WALL STACK THEREWITHIN SURROUNDING A HOLLOW CORE THROUGH WHICH A VERTICAL REINFORCING MEMBER EXTENDS AND REINFORCING BARS IN MORTAR IN VOID BETWEEN ADJACENT BLOCKS

CROSS-REFERENCE TO RELATED APPLICATIONS

This application claims the benefit of provisional patent application No. 60/561,702 filed Apr. 13, 2004, the entire disclosure of which is incorporated herein by this reference.

FIELD OF THE INVENTION

This invention relates to precast concrete building structures, and more specifically, to structures which may include compressed vehicular tires as a component.

BACKGROUND OF THE INVENTION

Various concrete structures have been disclosed for use in land and marine based applications. These applications include civil and structural applications such as walls, retaining walls, and breakwaters. These structures have included used tires as a component. Prior concrete structures incorporating used tires have usually suffered from one or more of the following problems or disadvantages: (1) low tire usage, (2) bare tires exposed to water in the environment, (3) risk of slippage and movement during use on inclined dirt banks, (4) inefficient stackability, (5) requiring field welding to connect units, and (6) insufficient system structural performance capability.

Examples of prior concrete systems include Kiselewski U.S. Pat. No. 4,997,309—a concrete clad tire log having a plurality of used tires made into a form by placing them in side wall to side wall contact and filling the form with concrete; Anderson U.S. Pat. No. 4,139,319—a monolithic revetment made of motor vehicle rubber tires and concrete; Nordberg U.S. Pat. No. 5,103,616—a method and container for encapsulating tires involving encapsulating a compacted bundle of tires and forming a cube of concrete having a hole; Baker U.S. Pat. No. 5,778,622—an earth stabilization structure comprising compressed annular tire walls; Clarke U.S. Pat. No. 5,172,528—a building construction incorporating recycled tires which have been in the form of compacted bales; Nordberg U.S. Pat. No. 5,214,897—a concrete block having a compacted bundle of tires encased in concrete; Pulsifer U.S. Pat. No. 4,080,793—a method and apparatus for using automotive tires as earth engineering devices; Lederbauer U.S. Pat. No. 4,785,577—a noise-absorbing greenery carrying structure made of worn tires; Haile U.S. Pat. No. 4,658,541—interlocking planters; Barthel U.S. Pat. No. 4,804,294—a method and means for erosion control; Cacossa, et al. U.S. Pat. No. 5,380,124—a beach stabilizer; Foehrkolb U.S. Pat. No. 5,378,088—a retaining wall made using segmented automobile tires; Lebanc U.S. Pat. No. 5,370,475—an erosion barrier system made from tires; Baker, et al. U.S. Pat. No. 4,288,175—earthen dams; Stiles, et al. U.S. Pat. No. 3,842,606—beach protectors made from used tires; Metten U.S. Pat. No. 5,400,561—concrete blocks having water drainage holes; and Terreta U.S. Pat. No. 5,092,076—a planter edging landscape system.

Each of these systems suffers from one or more of the previously described problems or disadvantages. Consequently, they either make relatively low or no use of used tires, allow bare tires to be exposed to water, run the risk of slippage and movement during use on inclined dirt banks, offer inefficient stackability, require field welding to provide structural continuity, and/or have insufficient system structural performance capability.

There is a need to provide general structural elements and methods for making and using them which have high content levels of used tire usage, structurally efficient and predictable characteristics, efficiently stackable features, slip resistance and other characteristics that enhance structural performance.

SUMMARY OF THE INVENTION

The present invention has to do generally with the field of large infrastructure, and more specifically, to articles of manufacture for building structures made of precast concrete and the process for making such a structural system. The structural system uses oversized hollow unit concrete blocks, and the invention relates, in part, to a method for making and using them. In one embodiment, the block comprises one or more compressed annular tire wall stack units made from used tire casings encased in reinforced concrete to form uniform building blocks. Alternatively, the building blocks may contain uncompressed used tires. In cross-section, the block can be square if a single stack of tires is used and rectangular if two or more stacks are used in it. The block has a hollow core through each stack unit. When three or more tire-bundles are oriented linearly, the rectangular block begins to resemble a girder, and when appropriately reinforced, it will act as one. (For purposes of this application the word "block" is substitutable for "girder" when describing a spanning member.)

The blocks can be formed by placing one or more stack units in a concrete form or mold designed to centralize the stack units so that reinforced concrete can be placed around them while maintaining the hollow core through the stacks. Once sufficiently cured, the block is removed from the form and is ready to be integrated into a structure upon reaching sufficient compressive strength.

In another embodiment, the void—otherwise occupied by the tire stack—is formed in the mold and left hollow, thus lightening the total weight of the block. Outwardly, the "void" block resembles the tire stack block with the exception of the undersurface which reveals a formed annulus—which creates the hollow annular structural core—and the void space around it which extends to the perimeter walls. Alternatively, the tire bundle stack can be placed in the form in the non-compressed state, creating a lighter void space than would otherwise be occupied by a compressed tire bundle stack.

The blocks may be used by placing them into an architectural and/or engineered labyrinth in a fashion similar to hollow unit masonry construction. (The blocks are offset row-by-row.) If the blocks are configured as a girder, the resulting structural member may be used as a spanning element between supports.

In one embodiment, the concrete block can include a shallow depression for the field placement of horizontal reinforcing bars along a hollow core surface of the block so that adjacent blocks can be joined when concreted (mortared). Optionally, this shallow depression can serve as a guide and key (groove) for blocks being stacked. This can be accomplished by tapering the inside lip of the lower block recess (groove) and by centering an opposite tapered protrusion (tongue) from the block located above the groove to form the interlock. Sides that are discontinuous—raised only at the extremities as defined by a single block—so that the horizontal reinforcing can crisscross in both directions, can also form this shallow depression. Alternately and/or in conjunction with the reinforcing, post-tension tendons may be passed through appropriately placed ducts which are precast into the blocks. These horizontal reinforcing bars or tendons can be provided in quantities and frequency as determined by independent structural calculations in order to create bond beam action between the blocks.

During field assembly, the shallow depression of successive blocks can be filled with concrete, thus encasing the horizontal reinforcing. While this concrete is still wet, successive blocks can be linearly placed on top of the row below which will bond the blocks together vertically. If post-tensioning techniques are used, the tendons—having been placed in the ducts—are stressed and grouted. In addition to the horizontal bond beam reinforcing bars, vertical reinforcing (bar, strand, pipe, or H-pile) is placed and concreted (mortared) into the stacks in quantities and frequency as determined by independent structural calculations, to create vertical interlocking and structural continuity. This vertical continuity can be continued below the structure into the earth through "pin" piles driven coincidentally with the hollow cores of the stacks and spaced as dictated by independent geotechnical calculations. The vertical hollow core surface may or may not be covered with concrete during precasting, depending upon the need to insulate the tire bundle from water in the in-place environment. Leaving this concrete cover off will enhance the field placed concrete (mortar) bond between the vertical reinforcement and the block.

If tire stacks are not used, the formed concrete annular structural core can be continuous to the bottom of the block or not, depending upon the structural requirements of the in-place system. If continuous, the void space between the annulus and the perimeter walls will remain hollow when vertical reinforcing is mortared in the annular space.

In summary, various embodiments of the invention address one or more of the following objectives:

(1) Relatively high use of used tires.
(2) To utilize concrete precasting techniques.
(3) To allow for the use of prestressing and/or post-tensioning structural reinforcing techniques.
(4) Reinforcing the block units using reinforcing steel sized and configured as needed to account for handling and in-place loads.
(5) To allow for system structural performance through structural analysis.
(6). Placing the blocks in stacks designed to centralize the stacks so that reinforcing and concrete can be placed around them while maintaining the hollow core through the stacks.
(7) Once sufficiently cured, removing the block from the form or mold, ready to be integrated into a structure upon reaching sufficient compressive strength.
(8) As a system, avoiding slippage relative to itself and to the underlying foundation.
(9) Efficient and fixed stackability.
(10) Avoiding field welding to connect the blocks.
(11) Horizontal interlocking between blocks accomplished using reinforcing bars and/or the tongue and groove configuration and/or post-tension tendons placed in the recess or grout duct provided therefor and concreted, mortared, or grouted in-place during the construction process.
(12) Vertical interlocking between blocks accomplished using reinforcing bars, post-tension wire strand, pipe, or H-piles placed in and through the stacks and mortared in-place during the construction process.
(13) Placing the blocks into an architectural and/or engineered labyrinth in a similar fashion as is the case in hollow unit masonry construction.
(14) The blocks being elongated and configured as girders and utilized by placing them between supports to carry loads over spanned distances.
(15) The tires rendered inert when exposed to water owing to the fact that they can be completely encapsulated in concrete if so needed. The tire stacks may be deleted in favor of a void space as a weight and concrete saving measure.

These and other aspects of the invention will be more fully understood by referring to the following detailed description and the accompanying drawings.

DETAILED DESCRIPTION

Figure 1:
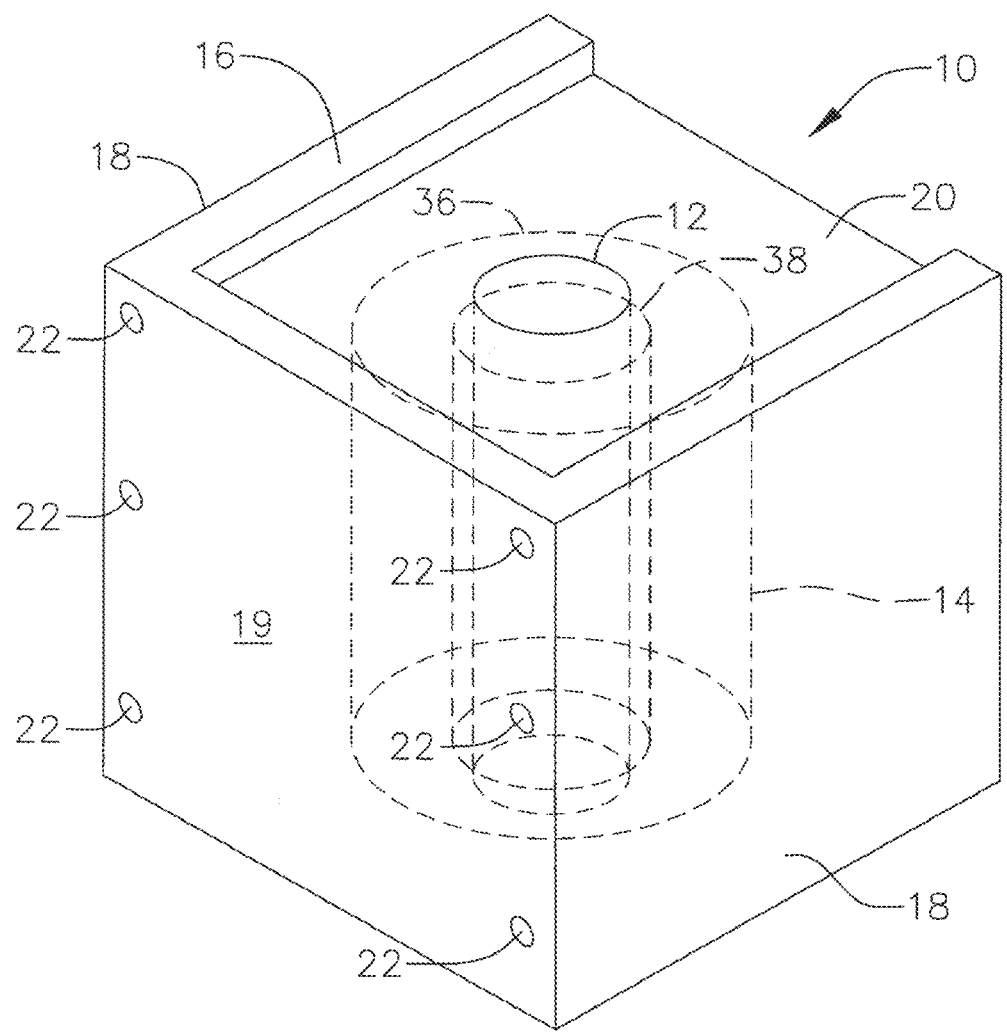
FIG. 1 is a semi-schematic perspective view showing a single core concrete block comprised of one annular tire wall stack unit (bundle) forming a square cross-section block which can typically be used as an end piece or half block in a structural system.

The drawings illustrate structural systems utilizing oversized hollow unit precast concrete blocks and a method for making and using them. Referring to one embodiment of the invention in FIG. 1, a precast concrete building block 10 comprises a compressed annular tire wall stack unit 14 encased in reinforced concrete. In cross-section, the block is square if a single tire stack is used and rectangular if two or more stacks are used. The block has a hollow core 12 extending through the stack unit to provide for vertical reinforcement. FIG. 1 illustrates the block 10 shaped generally as a cube, having a single tire stack unit 14 disposed centrally within the block. The precast block 10 includes a three-sided upwardly projecting lip 16 of generally uniform height spanning two opposite sides 18 and an end 19 of the block. This forms a shallow recess 20 of generally rectangular shape on an upper surface of the block within the outer lip. The recess 20 provides for bond beam (horizontal) reinforcement. The block 10 also includes separate rows of horizontally extending, vertically spaced-apart post tension ducts 22 formed inside the block. The ducts 22 are generally parallel to each other inside the outer side walls 18 of the block, below the opposite sides of the lip 16. The post tension ducts open through opposite end faces of the block and provide a means for containing reinforcing bars or tendons used in joining adjacent building blocks.

Figure 2:
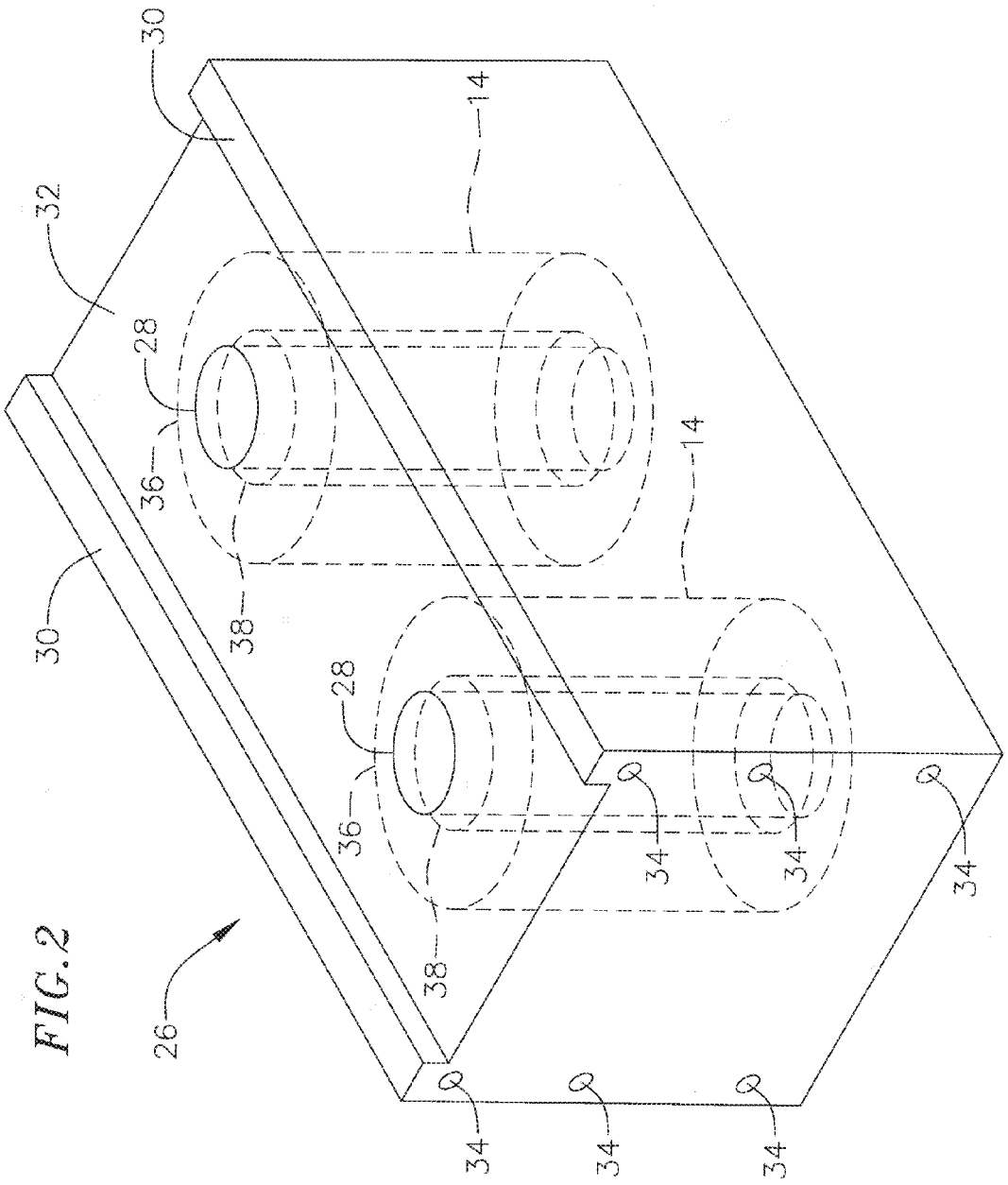
FIG. 2 is a semi-schematic perspective view showing a two core block comprised of two tire bundles encased in a reinforced concrete block.

FIG. 2 illustrates a double core building block 26 having a pair of axially spaced-apart, side-by-side tire stack units 14 embedded in an elongated rectangular shaped form of the building blocks. The compressed annular tire wall stack units 14 each have a hollow core 28 which opens through the top and bottom surfaces of the block. The hollow cores extend parallel to each other vertically, with their vertical axes disposed generally equidistantly from the opposite end faces of the rectangular block. The rectangular block has a narrow shallow lip 30 extending along each of the long sides of the block, forming a shallow rectangular shaped recess 32 in an upper face of the block. The recess opens through opposite ends of the block and provides a means for bond beam (horizontal) reinforcement. The rectangular block also includes post tension ducts 34 similar to the post tension ducts 22 described previously.

The blocks of FIGS. 1 and 2 are both referred to herein generally as being of rectangular linear configuration, with generally flat parallel side walls along the top bottom and ends of the block.

Figure 3:
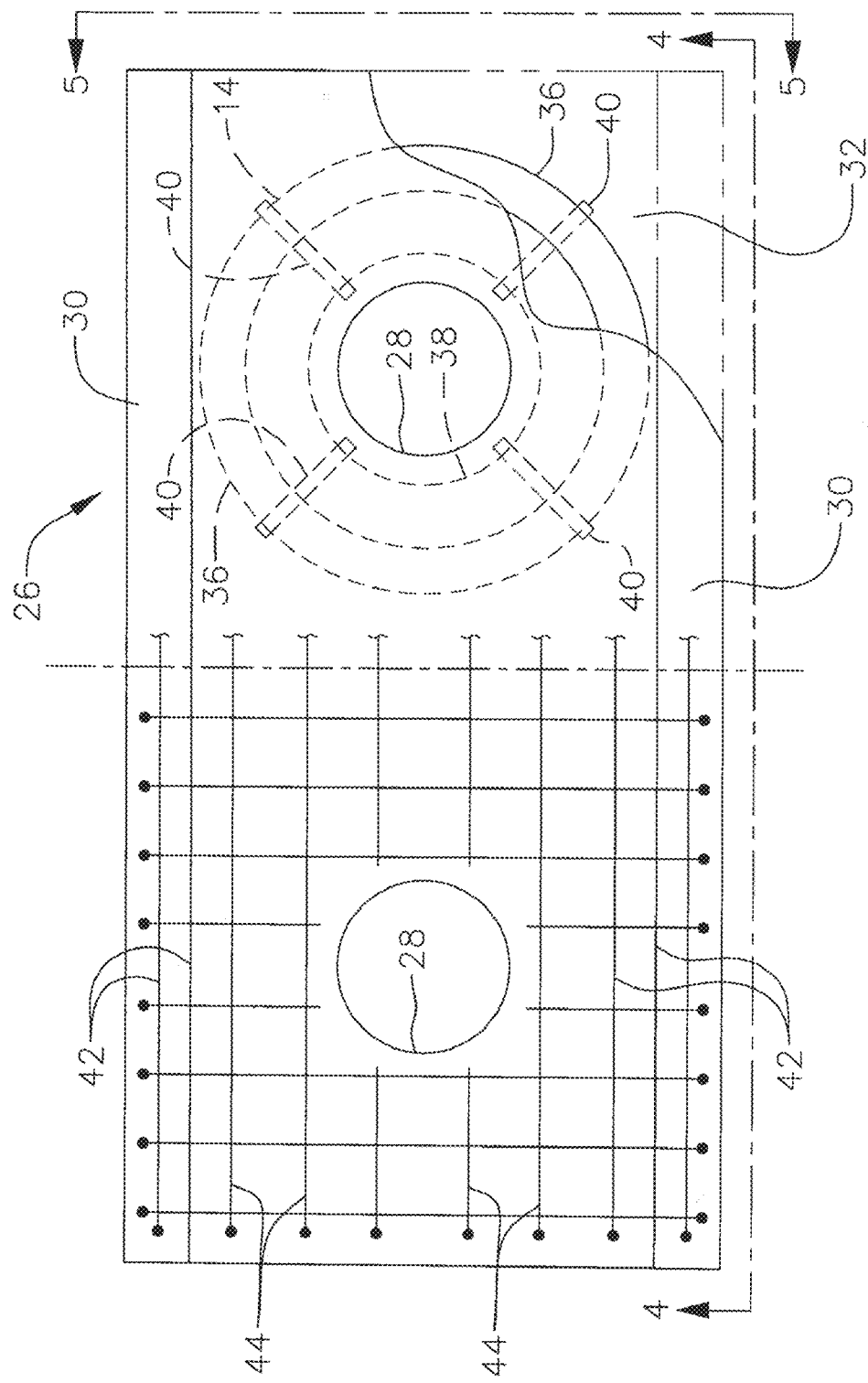
FIG. 3 is a semi-schematic top elevational view, partly broken away to show a tire bundle on one side and horizontal reinforcing on an adjacent side of a two core block.
Figure 4:
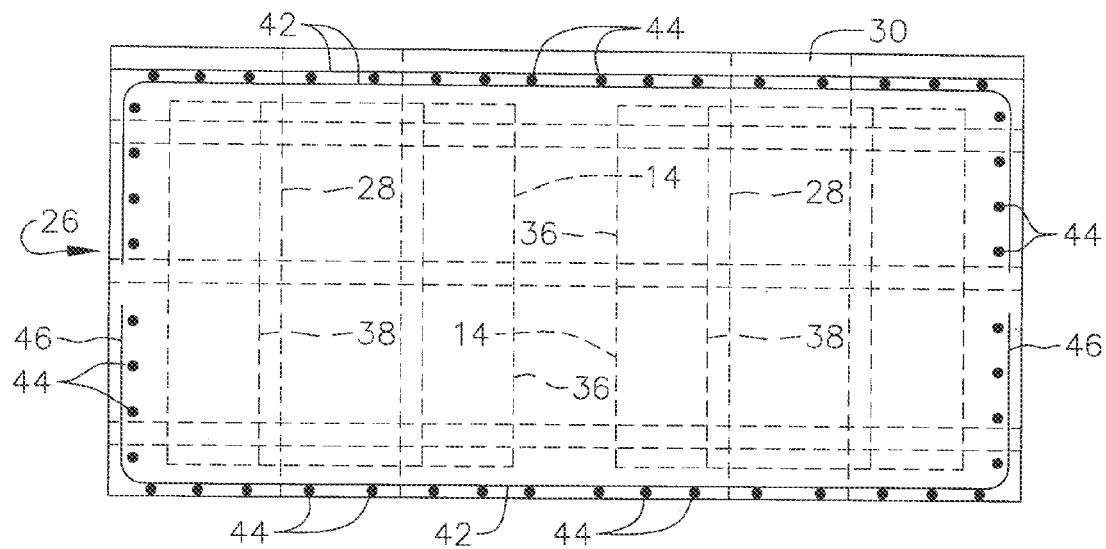
FIG. 4 is a semi-schematic side-elevational view taken on line 4-4 of FIG. 3.
Figure 5:
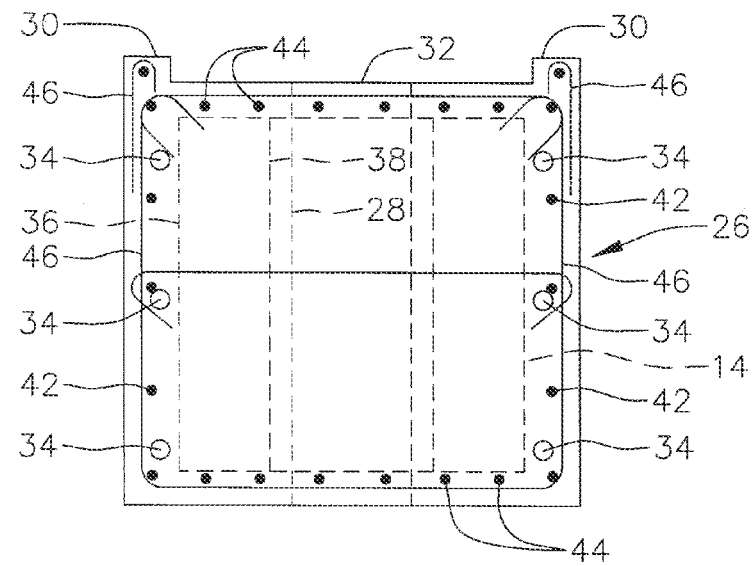
FIG. 5 is a semi-schematic end-elevational view taken on line 5-5 of FIG. 3.

FIGS. 3 through 5 illustrate further details of the double core block 26. The compressed annular tire wall stack units 14 are each embedded entirely in the precast concrete block. In one embodiment, each stack of tires comprises annular used tire wall sections 36 which are in a flattened form, having been parted in half on an axis along the center of the tire, parallel to the side walls. This forms generally cup-shaped annular tire sections which are then stacked and compressed. The tire wall sections can be of varying wall size with the central wheel rim holes 38 of the tire walls aligned on a common vertical axis. Truck tires and large equipment tires can be used in addition to used automotive tires.

As shown best in FIGS. 4 and 5, the circular tire rim holes 38 of the embedded tire walls are spaced inwardly from the wall of the hollow core 28 formed by the precast concrete block. The stack of tire wall sections is compressed under high pressure and banded together. In the process of precutting the tires, transverse cuts (not shown) can be made in the treads to aid in flattening the tire walls into a compressed stack. The compressed tires are held together by separate banding 40 wrapped around the tire walls on opposite sides of the central openings 38 through the tires.

In an alternative embodiment, the compressed tire stack units can be made by compacting the used tire casings via a hydraulic compacting machine such as the tire compactor disclosed in U.S. Pat. No. 5,121,680 to Nordberg. In this embodiment, the tires are compressed between moveable pressure plates and held in their compressed state by banding or wire similar to the banding 40.

In another embodiment, the tires may be interconnected by twisted wire cable driven through the side walls and held under tension after the tires are compacted. Either tire sections or full tires can be compacted and used in this embodiment.

In a further embodiment, the tires may be interconnected by compacting and applying sufficient heat to relax and fuse the individual units into a monolithic bundle. In order to do so, the bundle must be heated sufficiently to begin to liquefy the rubber. The apparatus applies heat to a pre-compressed bundle, thus eliminating the internal expansive force of the compressed bundle.

FIGS. 3 and 5 illustrate one embodiment of a reinforcing system comprising metal reinforcing bars embedded in the precast concrete block. The reinforcing system includes horizontal steel reinforcing bars 42 extending lengthwise along the block and reinforcing cross members 44 extending laterally across the block to form a reinforcing grid. The reinforcing system also includes vertical stirrup members 46 embedded along the side walls and end walls of the block and extending between the reinforcing bars along the top and bottom of the block.

Figure 6:
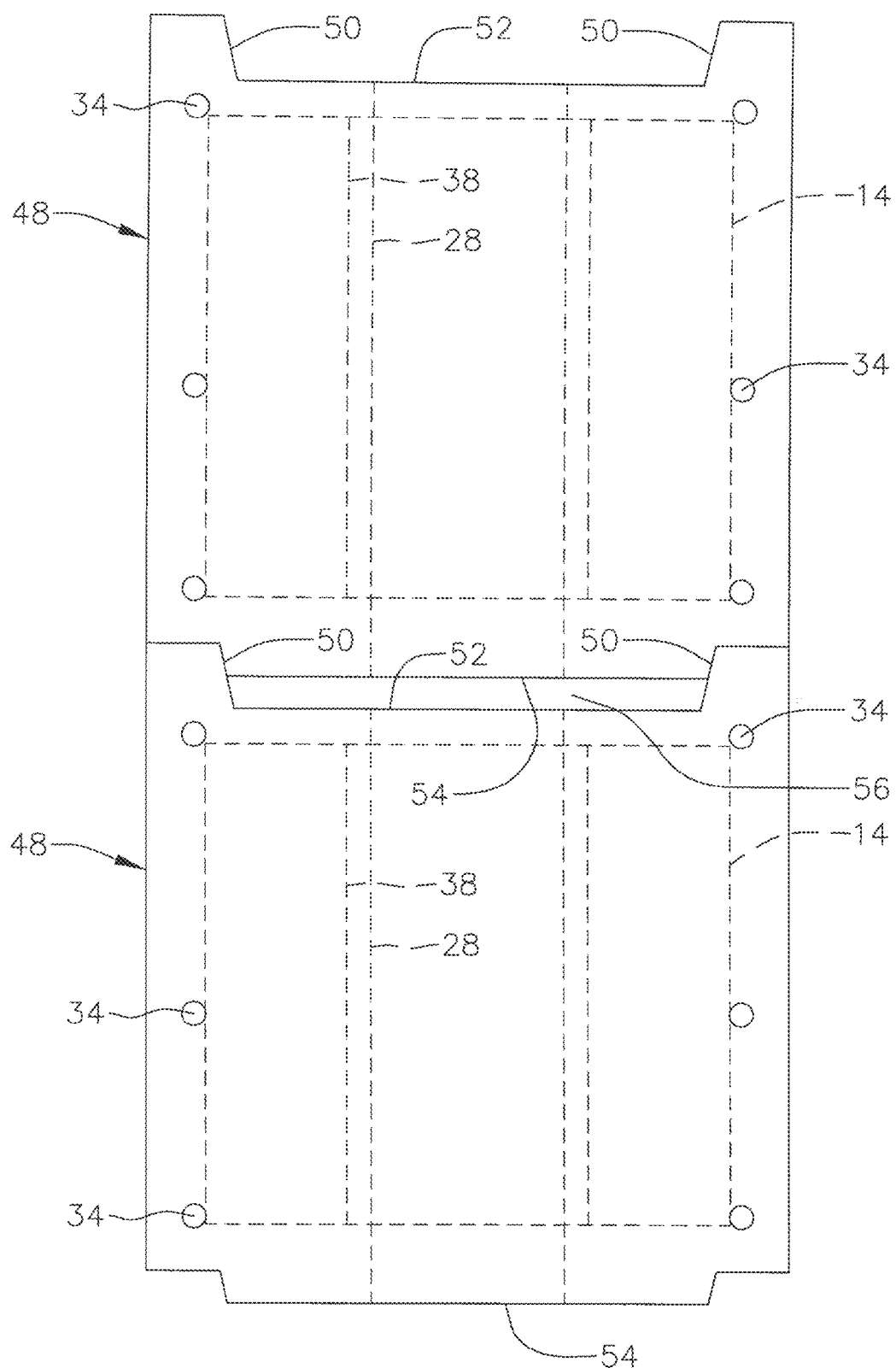
FIG. 6 is a semi-schematic end elevational view showing sections of a double core block having a tongue and groove guide and interlock.

FIG. 6 is an end elevational view illustrating an alternative form of the invention in which a pair of double core blocks 48 can be stacked vertically. This view illustrates a tongue and groove guide and interlock system in which each precast concrete block 48 has a tapered upper lip 50 extending longitudinally along opposite sides of each block, forming an elongated open-ended recess 52 along the top surface of each block. Each block also has a tapered protrusion 54 extending along the bottom of each block. The tapered protrusion 54 of one block has a width which allows the bottom of the block to fit into the recess formed in the block stacked below it in an interlocking fit, with the protrusion 54 of the upper block wedged against the tapered lip on each side. This leaves a narrow void space 56 between the recessed area atop the lower most block and the bottom surface of the protrusion of the uppermost block.

Figure 7:
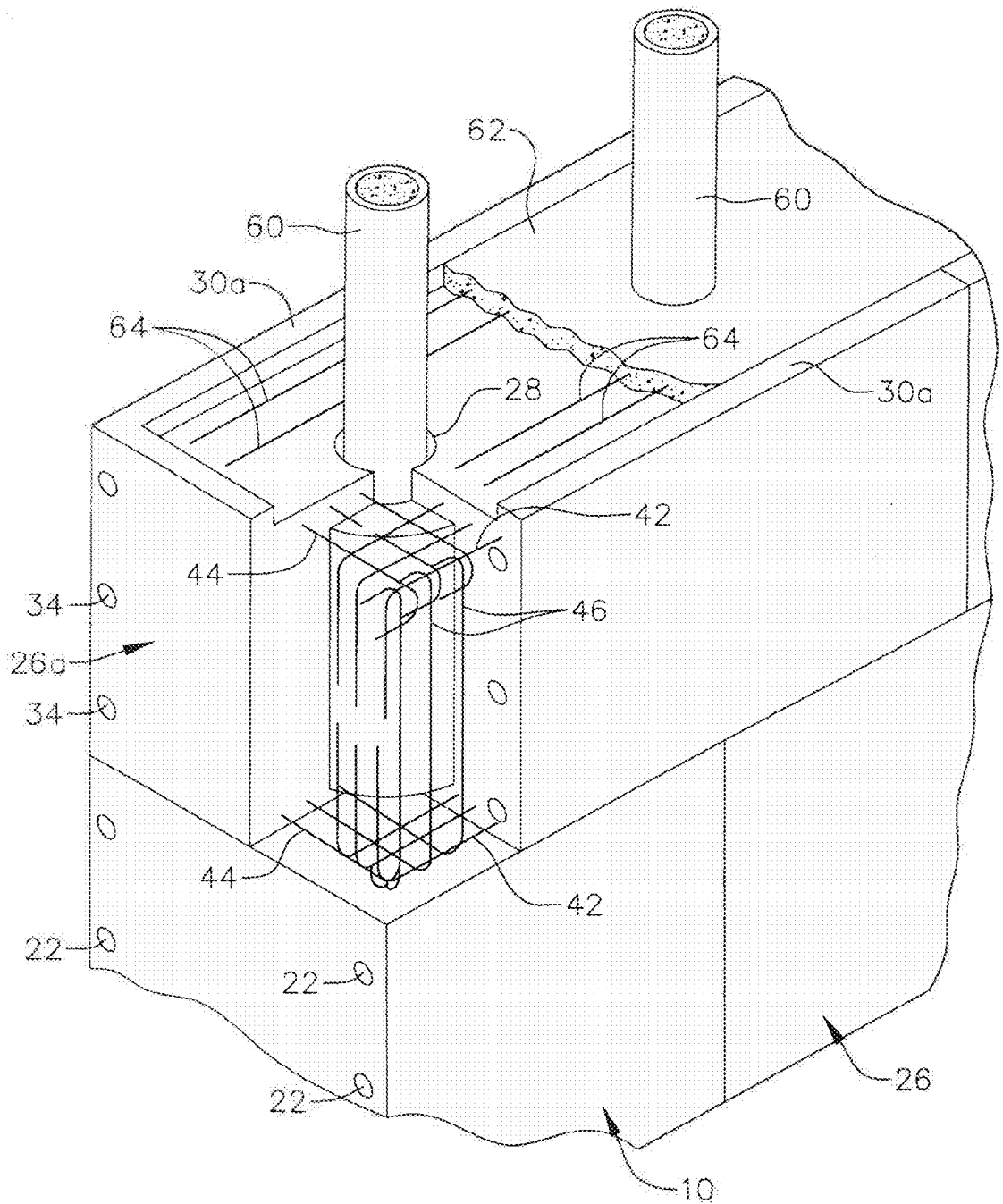
FIG. 7 is a fragmentary semi-schematic perspective view, partly broken away, showing blocks integrated into a wall.

FIG. 7 illustrates a structural system made from bonding together the precast concrete building blocks of this invention. This structural system has its building block units offset in alternating rows in accord with common hollow unit masonry construction. In this embodiment, one row of blocks has a single core block 10 placed at one end followed by double core blocks 26 in the same row. The next row above starts with the double core block 26a at one end continuing with double core blocks to form the offset joint construction. The double core block 26a at the end of the second row has a three-sided outer lip 30a at its top to form a narrow recess that extends the length of the structural unit formed by the assembled building blocks. The cutaway view of FIG. 7 shows the reinforcing grid of steel reinforcing bars 42 and 44 and the interconnecting metal stirrup bars 46 which are embedded in the precast concrete blocks.

FIG. 7 illustrates vertical reinforcement members 60 which are mortared in place in the hollow cores 28 of the assembled building blocks. In the illustrated embodiment, the vertical reinforcing members comprise steel pipes filled with concrete. They are each positioned within the vertically aligned hollow cores of the assembled building blocks so that the vertical structural members 60 can extend parallel to the one another at horizontally spaced apart locations along the length of the assembled structural unit.

FIG. 7 also illustrates a bond beam reinforcing system in which bond beam concrete or mortar 62 is field-placed in the continuous horizontal recessed region that extends along the upper rows of the assembled building blocks. Horizontal bond beam reinforcing bars 64 are embedded in the mortar 62 to provide spaced apart reinforcing along each row of blocks in the structural unit. Generally speaking, these metal reinforcing bars are one to 1-½ inches in diameter.

Figure 8:
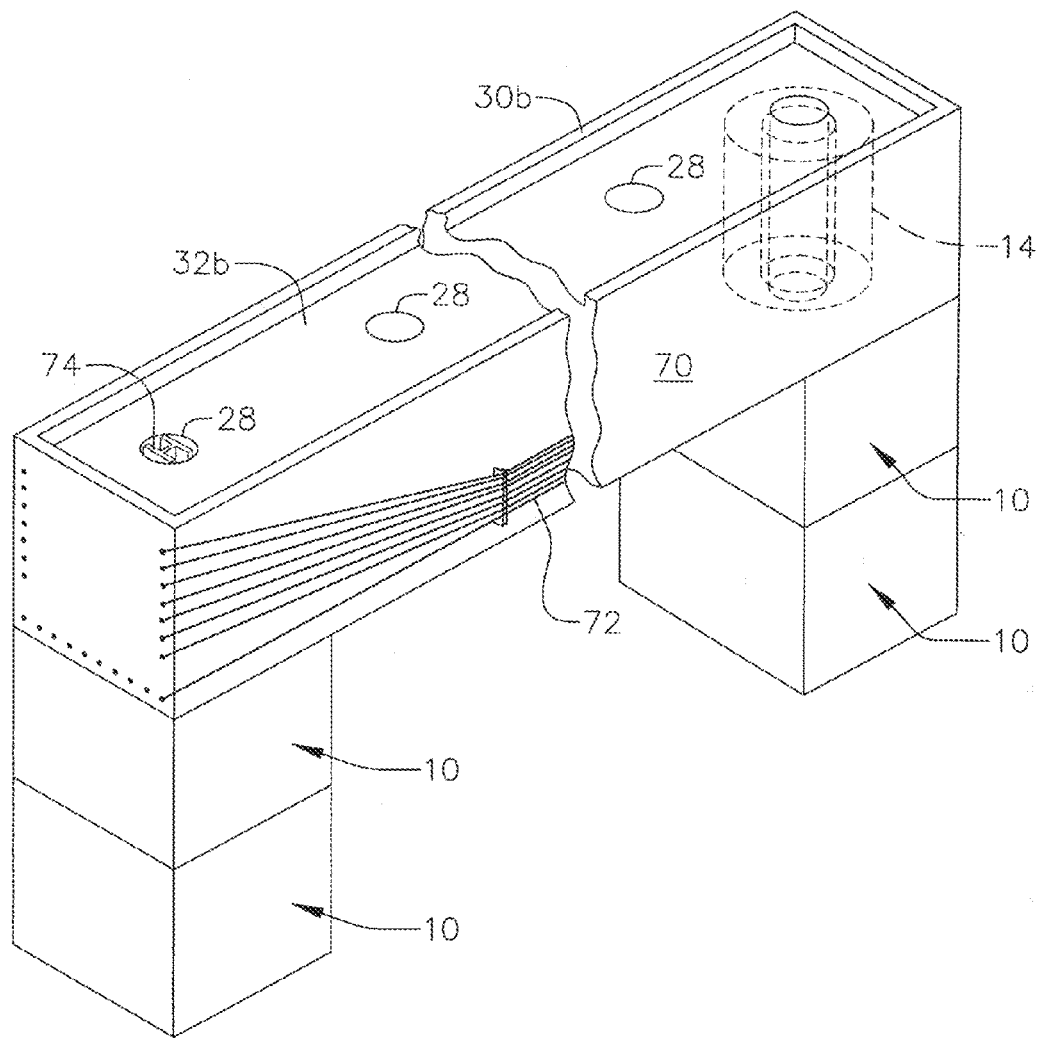
FIG. 8 is a fragmentary semi-schematic perspective view showing a plurality of bundles used to form a member which will act as a girder and provide spanning capabilities.

FIG. 8 illustrates a multiple core girder 70. (In this embodiment the steel reinforcing grid bars and stirrups are omitted for clarity.) The girder includes a series of the compacted annular tire wall stack units 14 spaced apart along the length of the girder. (Only one stack unit is shown for clarity.) The girder has a four-sided outer lip 30b spanning the outer periphery of the girder, forming the lip of the horizontal reinforcing recess 32b. This view also shows the hollow core 28 through the block for vertical reinforcement needed only at the abutments, whereas others are shown to illustrate the fact that the tire bundles are inside the girder but may be cast over during precasting. This view shows that the girder can span a horizontal distance between two upright concrete structural units formed by separate precast concrete single core units 10 stacked on one another and supporting the outer ends of the girder. This view also shows harped and horizontal prestress reinforcing strands 72 embedded in the precast concrete girder and vertical H-pile reinforcing at 74.

Figure 9:
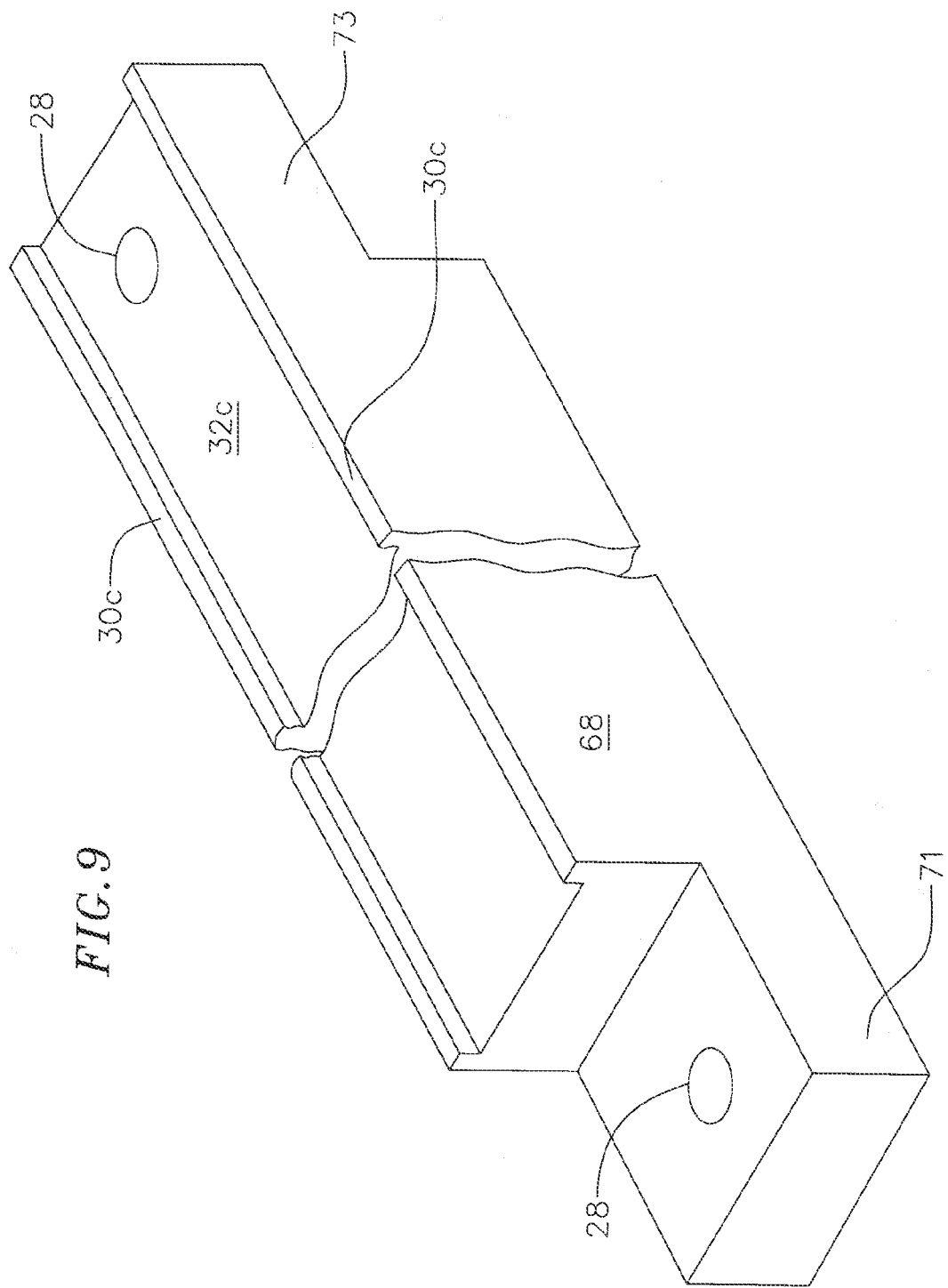
FIG. 9 is a fragmentary semi-schematic perspective view showing a girder with shiplap ends.

FIG. 9 illustrates a multiple core girder 68 with shiplap ends. This girder includes a separate lip 30c extending along each side of the girder with an open ended recessed area 32 along the upper surface of the girder. An underlay end 71 on one end of the girder projects outwardly from the bottom of the girder and an overlay end 73 at the upper end of the girder projects outwardly from the opposite end of the girder. Hollow cores 28 used for vertical reinforcement are shown only at the ends. In this embodiment, half-height tire stack units are used only at the ends. Vertical reinforcing can extend above this core to be used as a guide for subsequent girder placement.

Figure 10:
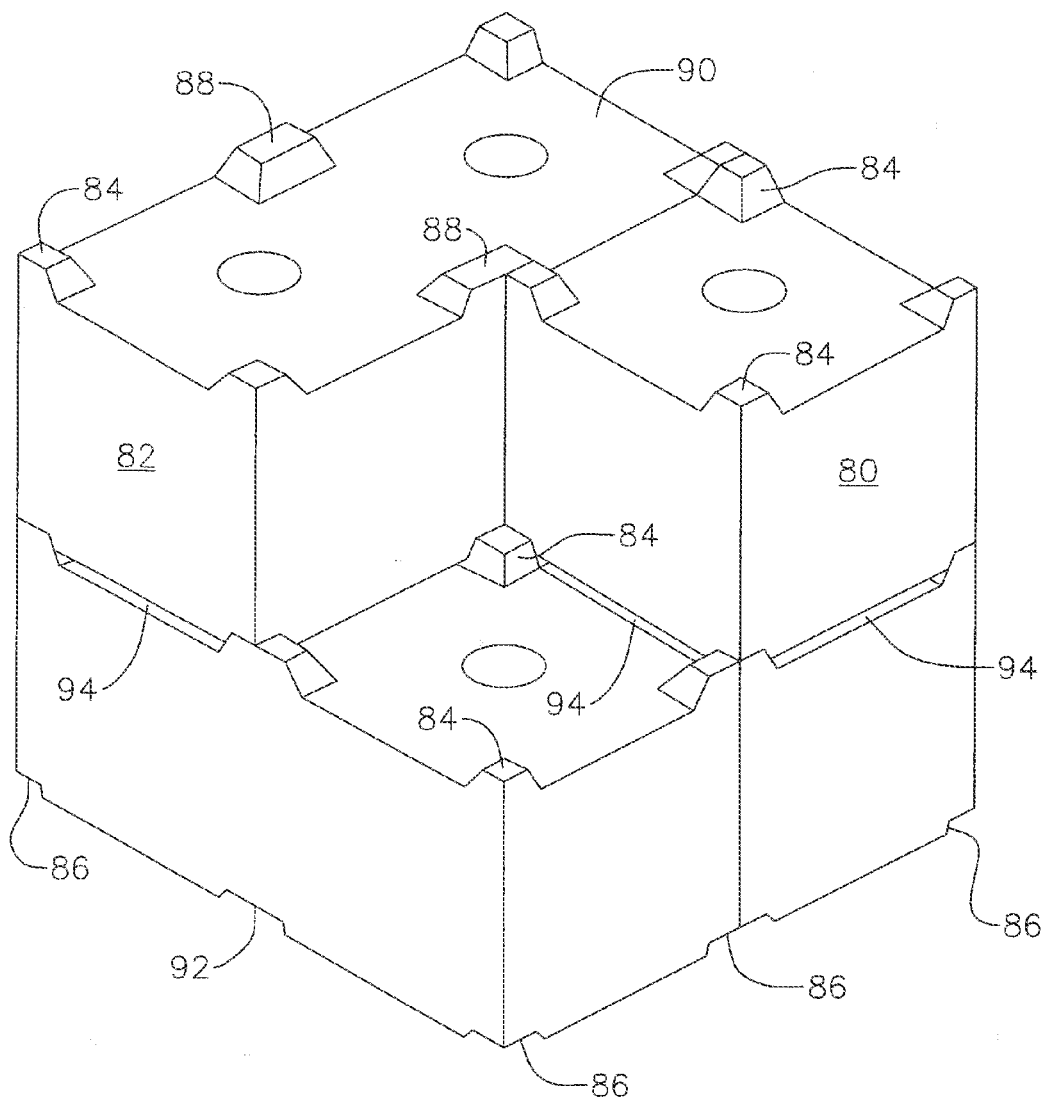
FIG. 10 is a semi-schematic perspective view showing "universal" double and single blocks—stacked and offset in both directions—utilizing tongue and groove interlock and discontinuous sides to allow for the placement of horizontal reinforcing bars in both directions.

FIG. 10 illustrates double and single blocks—stacked and offset in both directions—utilizing tongue and groove interlock and discontinuous sides to allow for the placement of horizontal reinforcing bars in both directions. Each rectangular block can be square shaped, as the block 80, or rectangular shaped, as the block 82. The upper corners of the blocks have tapered shoulders 84 projecting upwardly and positioned to interlock with corresponding tapered recessed areas 86 in the corners of a similar block (80 or 82) stacked below them when the blocks are stacked. The rectangular blocks have centrally located shoulders 88 on opposite sides of the upper recess 90 in corresponding elongated intermediate recessed regions 92 below them. Stacking of the blocks leaves void spaces 94 running laterally and longitudinally between the array of stacked blocks to provide for mortar and reinforcing as described above. The sides of the blocks may or may not be discontinuous depending on their position within a structural system, i.e., on an outside edge they may be continuous. The "universal" blocks shown can be made to work in any position in a structural system by placing end forms on the outer discontinuous side so that the grout does not flow out when placed.

The blocks of FIG. 10 also can include "container" fittings (not shown) on top and bottom which assist in their handling and which enable them to be stacked in terminals and on barges or ships. These fittings consist primarily of embedded steel plate with oval-shaped holes at the lift points. For transport or storage, the blocks can be stacked and connected to each other with IBCs (inter-box connectors). These pieces of hardware can fit into the oval holes of the block above and below and which are then turned to lock the two together. If used in place, the connectors have structural value and can be considered in the final design of a structure.

The blocks which contain tire stack units are formed by placing one or more tire stack units in a concrete form (mold) designed to centralize the stack units so that concrete can be placed around them while maintaining the hollow core through each stack. Once sufficiently cured, the block is removed from the form and is ready to be integrated into a structure upon reaching sufficient compressive strength. The blocks may be utilized by placing them into an architectural and/or engineered labyrinth in a similar fashion as is the case in hollow unit masonry construction, where the blocks are offset row-by-row. If configured as a girder, the precast concrete member may be used as a spanning element between supports.

The shallow recess 20 or 32 is made for the field placement of horizontal reinforcing bars along the hollow core surface of the block and/or in post-tensioning tubes cast within the blocks so that adjacent blocks can be joined when concreted (mortared). These horizontal reinforcing bars or strands are provided in quantities and frequency as determined by independent structural calculation in order to create bond beam action between the blocks. During field assembly, the shallow depression of successive blocks is filled with concrete for encasing the horizontal reinforcing bars. While this concrete is still wet, successive blocks can be linearly placed on top of the row below which will vertically bond together the blocks vertically. Alternately, the lip along the horizontal reinforcing recess having slightly sloped sides as shown at 50 in FIG. 6 forms a groove of a tongue-and-groove assembly. The protrusion 54 at the bottom of each block will slide into the groove of the receiving block to help guide and interlock the units.

In addition to the horizontal bond beam reinforcing bars, the vertical reinforcing (bar, strand, pipe, or H-pile) can be placed and concreted (mortared) into the stacks in quantities and frequency as determined by independent structural calculation in order to create vertical interlocking and structural continuity. Alternately, the shiplap geometry can be cast into the ends of the blocks so that the vertical reinforcing can penetrate and adjoin adjacent blocks. This vertical continuity can be continued below the structure into the earth through "pin" piles driven coincidentally with the hollow cores of the stacks and spaced as dictated by independent geotechnical calculations. The vertical hollow core surface may or may not be covered with concrete during precasting depending on the need to insulate the tire bundle from water in the in situ environment. Leaving this concrete cover off will enhance the field placed concrete (mortar) bond between the vertical reinforcement and the block.

Tires come in various rim diameters, tire heights, and section widths. As such, tires of similar geometric properties are best suited to be bundled together. Some variation between tires is welcome within a tire stack because this increases the bond between the stack and the concrete in which it will be embedded. Minimum coverage between the tire stack and the outside edge of the block is maintained and varies depending on the application and internal reinforcing requirements of the block. The size of the core can vary as a function of the constituent tire rim diameter but must be sufficient in size to accommodate field-placed vertical reinforcing as determined by independent calculation of the built-up structure's load requirements.

The unit block 10 (comprised of a single stack) varies in overall dimensions because of the potential for variability of tire bundle cross-sections. However, this variation is properly handled as a step function. Unit blocks made from tires having rim diameters of 12 to 14-inches are on the order of 40-inches×40-inches×40-inches. Unit blocks made from tires having rim diameters of 15 to 17-inches are on the order of 48-inches×48-inches×48-inches. Unit blocks made from tires having rim diameters of 18 to 22-inches are on the order of 56-inches×56-inches×56-inches to 60-inches×60-inches×60-inches. This relationship between rim diameter and block size is not hard-and-fast because once the minimum internal structural requirements of the unit block are met, it becomes a question of cost. Engineering calculations can be used to optimize the relationship between the bundle volume, reinforcing, and concrete volume in order to minimize unit costs. Larger tire sizes are treated similarly.

As the tire size increases, the blocks begin to approach the size of shipping containers. The most common container sizes used in international commerce are 20 ft. 28 ft., 40 ft., and 48 ft. Other sizes are 10 ft. (used primarily in Europe and by the military services), 24 ft, 44 ft., 45 ft., 46 ft., 53 ft., and 56 ft. The typical container height is 8 ft. 6 in. So-called high-cube containers are 9 ft. 6 in. Some containers of less than 8 ft. and there are also half-height containers of about 4 ft. The standard width of containers used in international commerce is 8 ft. These dimension (and consequential gross tonnage) is used as guidelines when sizing larger blocks for standardized commercial handling and shipping.

For a 60-inch high block, a 48-inch high tire bundle unit is suitably used to provide 4-½ inches of concrete cover at the top surface and 3-inches at the bottom. A 48-inch high bundle will typically have about 56 tire halves or 28 full tires. In one embodiment, the tire halves are produced by cutting the tire in half down the middle of the tread. The tire halves are made suitable for compression and bundling by making 16 or more cuts transverse to the tread to permit the tread section to be compressed to a substantially planar orientation relative to the sidewall of the tire (rather than the tire half having its cup shape). In producing the bundle, a plurality of tire sidewalls are stacked and compressed such as by hydraulic ram force, and are banded in a stacked position using steel, stainless steel, or nylon banding.

The block surrounding the tire stack is a concrete structure utilizing concrete wire mesh and/or reinforcing steel which is oriented within the concrete horizontally and vertically as necessary to meet both handling and in-place structural requirements.

In making the block, a concrete form (mold) is utilized. The structure has one, two or more hollow cores formed by a tapered and/or removable pipe sleeve which is part of the form-work which is placed through each tire stack. This hollow core permits passing field-placed vertical reinforcing therethrough from block-to-block.

In the concrete form, each tire stack is positioned over the pipe sleeve(s) and reinforcing steel and/or wire mesh are positioned around the stack and within the form. Concrete is then poured into the form encasing the tire stack, the reinforcing steel and/or the wire mesh. Reinforcing steel is arranged in the concrete form to ensure strength during handling, placing, and in-place structural demand.

Figure 11:
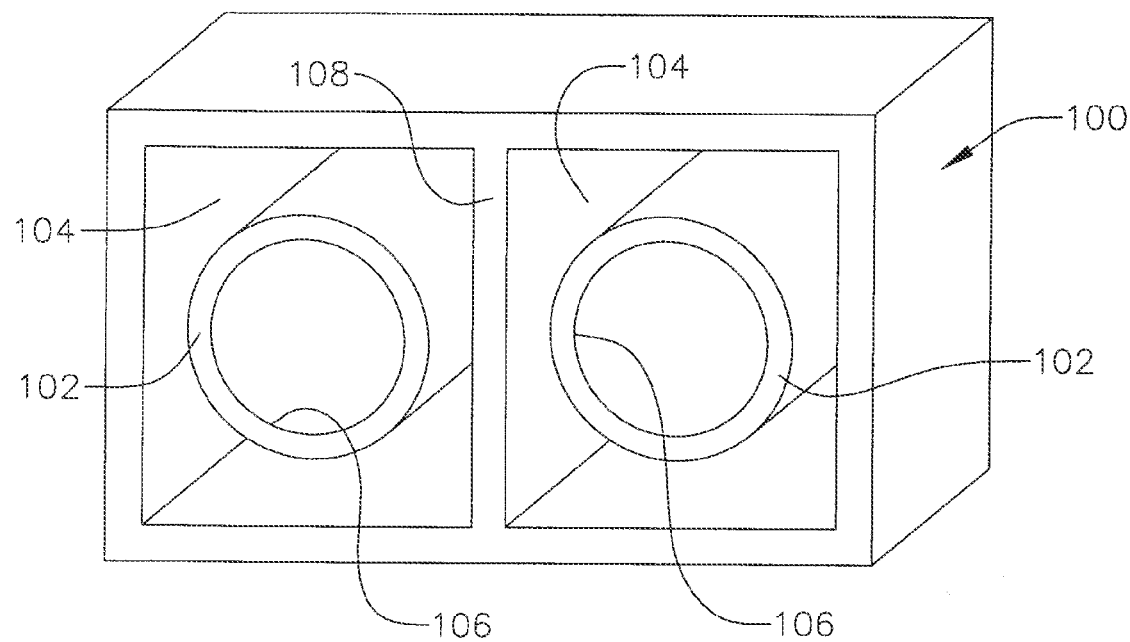
FIG. 11 is a bottom perspective view showing an alternative form of the invention which includes a formed annulus or core structure and internal void space.
Figure 12:
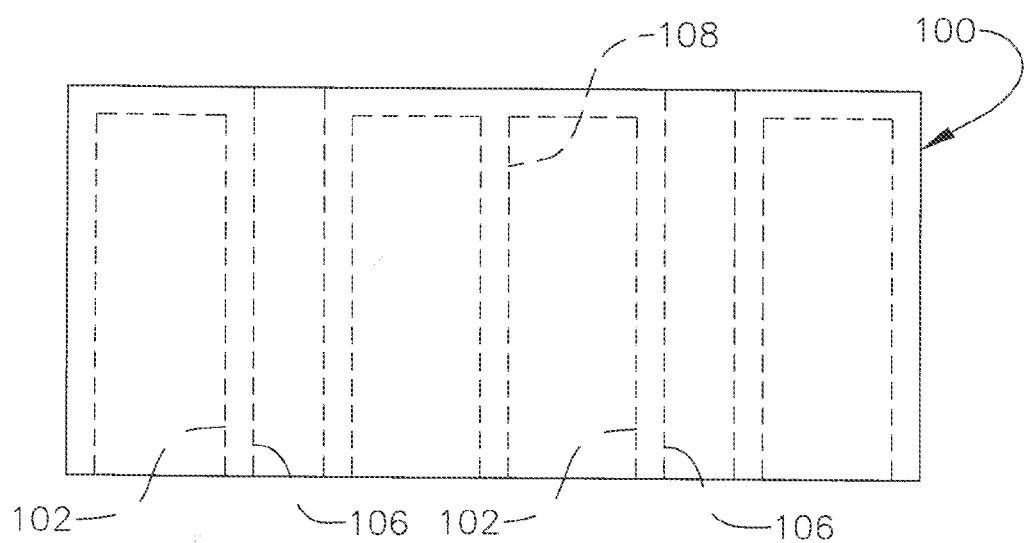
FIG. 12 is a side elevational view of the concrete block shown in FIG. 11.
Figure 13:
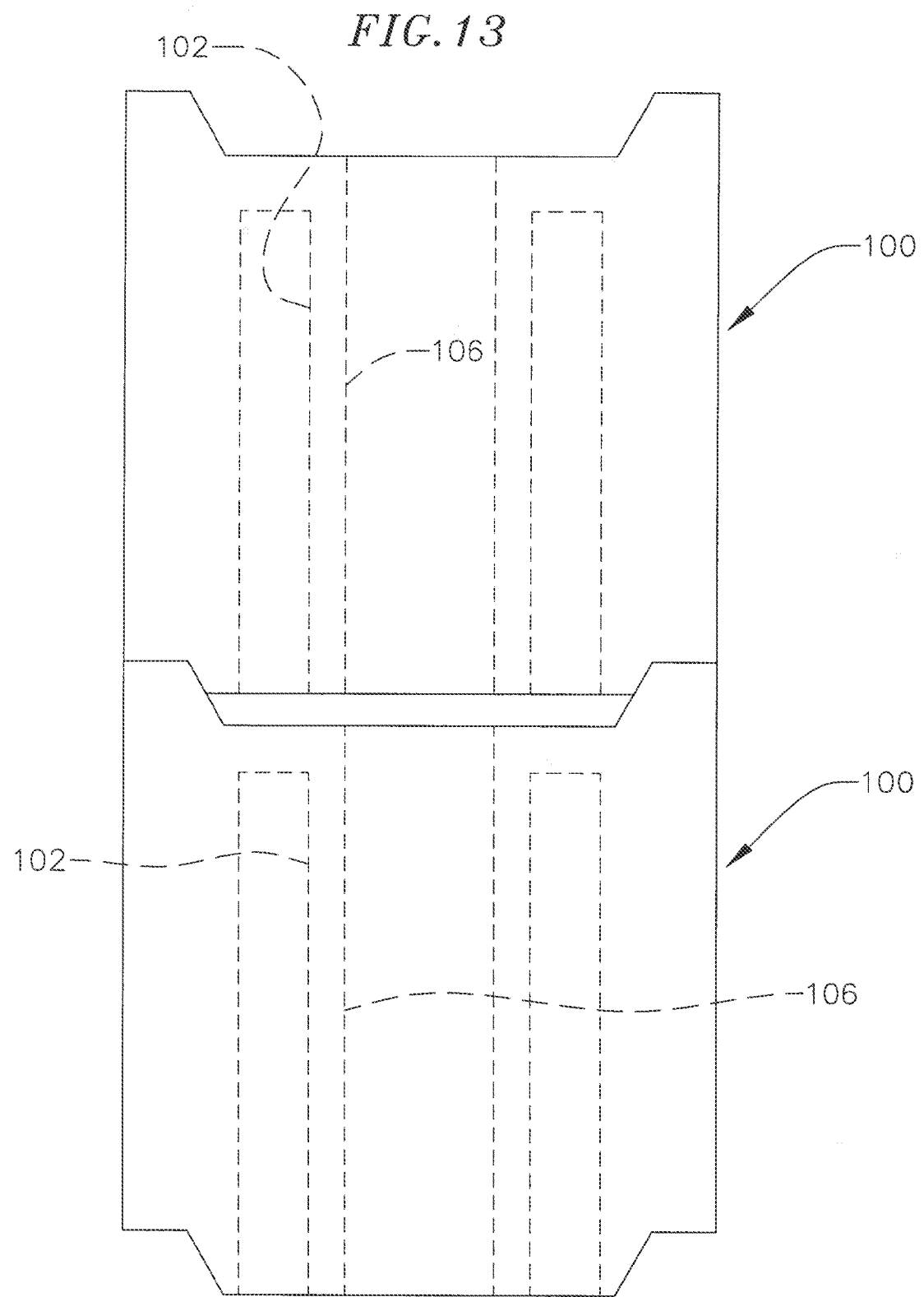
FIG. 13 is a side elevational view showing an alternative embodiment of the block having a formed annulus and void space, two of which blocks are stacked, utilizing a tongue and groove interlock and discontinuous sides to allow for the placement of horizontal and vertical reinforcing bars.

FIGS. 11 through 13 show an alternative embodiment of the invention in which the compressed tire units are not used. Instead, a void space is left inside the precast concrete block where the compressed tire units are shown in the previously described embodiments. FIGS. 11 and 12 schematically illustrate a rectangular shaped block 100 with two side-by-side void spaces. The FIG. 11 embodiment is a bottom view which shows the rectangular block on edge without the tire stacks. This embodiment includes two annular core structures 102 generally tubular in shape and integrally formed with the block wall structure. A separate rectangular void space 104 surrounds each annular core structure. The core structures extend the full height of the block and each has separate openings 106 passing through the core structures. They form separate side-by-side openings extending through the top of the block. A partition 108 separates the two void spaces.

This option essentially reduces the overall weight of the block owing to the fact that rubber is around two thirds the weight of concrete. Thus, when deciding which block configuration should be used to build a structure, a cost benefit analysis can be used to compare the offsetting costs of tire disposal credits against block handling and concrete costs—both in place (mortar) and precast.

FIG. 13 shows two concrete blocks which are stacked and which utilize the tongue and groove interlock and discontinuous sides to allow for placement of horizontal and vertical reinforcing bars. In this instance the two stacked concrete blocks are similar to the embodiment of FIGS. 11 and 12 which contains the annular core structure and hollow void space.

Figure 14:
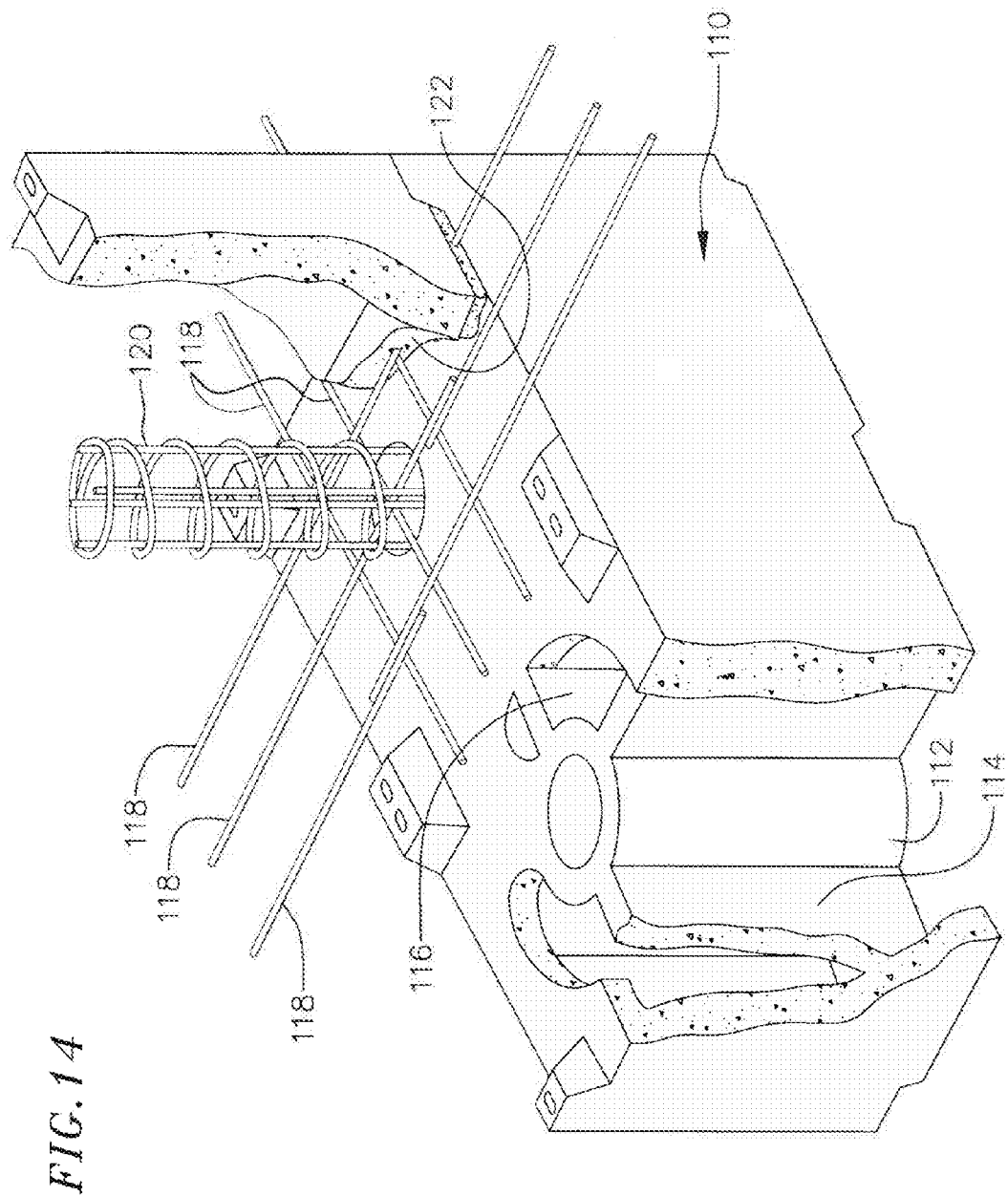
FIG. 14 is a schematic perspective view, partly broken away, showing field-placed reinforcing and mortar for a concrete block structure of this invention.

FIG. 14 shows use of a hollow core block 110 similar to the block shown in FIGS. 11-13. The hollow core block 110 is precast with the annular core structure 112 and radial web structures 114 extending through the void space 116 to reinforce the core structure. Representative block reinforcing is not shown (see FIG. 5 for similar reinforcing). Representative field placed reinforcing steel—both horizontal and vertical—is shown at 118. A pre-tied spiral reinforcing column-type cage 120 is placed around the hollow core prior to sliding horizontal bars through. Horizontal reinforcing lap splices are shown. The poured-in-place mortar concrete is shown at 122. This field placed concrete is pumped in between successively stacked blocks forming a bond and encapsulating the field-placed reinforcing, both vertical and horizontal.

In use, the blocks are useful for any number of structural applications particularly in large infrastructure works such as retaining walls, structural embankments, abutments, spandrel girders, dikes, quays, erosion control, and other massive structures. The walls may be formed in various alternative orientations as dictated by specific application.

The present invention provides for the efficient and effective utilization of waste tires while also providing for efficient and effective large block construction. The present system has numerous advantages over prior concrete tire systems including the ability to conventionally affix adjacent units to create a rigid concrete wall or structural system which may be shaped in numerous orientations due to the rectilinear nature of the system. Due to the use of horizontal bond beam reinforcing placed in the recess and vertical column reinforcing placed through the uniform circular shaped cores, structural behavior is predictable and controllable through structural analysis. Additionally, plants may be positioned to grow in the cores. The walls may be of various forms and may be entirely covered with dirt or water—either fresh or salt.

The need to conform to infrastructure alignments leads to potentially curved structures. Blocks can be cast with tapered ends so that when joined they can forms such curves. Alternately, the blocks can be laid out tangentially as is done in conventional masonry block construction leaving voids in the vertical joints to be filled (or not) with concrete in the field.

Applications

Large infrastructure works require numerous types of structural elements which can be configured from the blocks. These range from retaining walls to abutments to approaches to any number of mass structures both in and out of the water. These structures likely require geotechnical and engineering analyses of the system which is site dependent. These analyses utilize the predetermined structural properties of the individual blocks.

The geotechnical properties of the construction site play a pivotal role in determining the type of foundation structure upon which the overall structure is founded. This can be any number of conventional foundation structures such as a graded and compacted sub-base or a deep pile foundation. Interfacing the foundation with the blocks is a matter of design. It is noted that the block cores can be used to receive foundation piles.

The use of the blocks in the marine environment is advantageous. Delivery to a marine construction site of the blocks from a precast concrete plant can be by oceangoing barge and thus is less constrained by size and weight than is to landside construction sites (the weight and size limit generally is governed by the load capacity of the plant handling equipment). Both oversized tire bundles (for example, made from large construction or agricultural equipment tires) and multiple unit blocks comprised of numerous bundles are practical. Large mat like blocks can be placed, greatly speeding construction. The field placed horizontal reinforcing can be arranged and tied up above the water surface and lowered into the recess on top of the submerged blocks. Additionally the subsequent course of blocks can have a protrusion on the bottom and a recess on the top thus creating a tongue-and-groove bond beam cavity. Once a reasonably uniform bed has been prepared on the river or ocean bottom so that the blocks will rest relatively true, the block placement can begin. Pin-piles can be driven through the block cores to increase foundation performance in soft soils. These piles can also be used as guide piles if left exposed above the surface of the water. Blocks with the shiplap ends are useful here as a means of easily aligning blocks over the piles above the water surface prior to lowering them into place.

In large complex structures, some blocks will require unique features such as block-outs embedded plates, conduits and/or other architectural and/or structural considerations. Thus, tracking of the blocks from casting through the supply chain to its final position in the structure becomes imperative. Industry standard bar coding or smart chip technology allows each block to be uniquely identified so that its location can be tracked (even in real time), thus facilitating the entire process. In many cases just-in-time delivery will be essential in order to minimize re-handling costs.

The invention has been described with respect to various structures using combinations of the concrete block structures of this invention. Embodiments of structures using concrete blocks containing compressed or uncompressed tire casing units also can be constructed using concrete blocks containing the annular core and void space form of the invention, and vice versa.

What is claimed is:

1. A reinforced concrete block structural system comprising:

multiple precast concrete structural building blocks;

each building block comprising a tire wall stack unit having a plurality of stacked annular used motor vehicle-type tire walls maintained in a compressed or uncompressed state and having a central opening passing through the tire wall stack unit, the tire wall stack unit embedded in the precast concrete structural building block of generally rectilinear configuration; a shallow recessed area extending across an upper surface of the building block, the central opening of the tire wall stack unit spanning a hollow core which extends through the building block in vertical alignment with the central opening through the tire wall stack unit, the hollow core having open ends passing through a bottom side of the building block and through the shallow recessed area on the upper surface of the building block, the recessed area extending laterally between generally parallel side walls on opposite sides of the building block, the side walls spaced laterally outwardly from the open end of the hollow core which passes through the building block upper surface;

the structural system formed by at least one horizontally extending upper row of said building blocks positioned side-by-side along the upper row and stacked on at least one horizontally extending lower row of said building blocks positioned side-by-side along the lower row, the hollow cores in the building blocks aligned vertically between adjacent upper and lower rows of the stacked building blocks;

the recessed areas in the building blocks positioned in the lower row cooperating with the bottom sides of the building blocks positioned in the upper row to form a long, continuous void space extending horizontally between the upper and lower rows of the stacked building blocks and extending laterally between the side walls of the horizontally positioned building blocks;

the structural system further comprising vertical reinforcing structural members passing through the aligned hollow cores of the building blocks in said upper and lower rows and mortared in place in the hollow cores; and a plurality of metal reinforcing bars contained in the continuous void space on opposite sides of the vertical reinforcing structural members, the reinforcing bars mortared in place in the void space along opposite sides of the vertical reinforcing members to form a horizontal bond beam reinforcing structure positioned between and bonding the upper and lower rows of the stacked building blocks.

2. The structural system according to claim 1 in which the building blocks in one of the upper and lower rows are offset horizontally from the building blocks in the other of the upper and lower rows.

3. The structural system according to claim 1 in which generally horizontally extending ducts extend through each building block on opposite sides of the hollow core in the building block; and in which post-tension tendons extend through the ducts in the upper and lower rows of the stacked building blocks and which are grouted in place in the ducts.

4. The structural system according to claim 1 in which the vertical reinforcing structural members comprise any one selected from the group consisting of concrete-filled metal pipes, concrete piles, H-beam piles and pin piles for cooperating with the stacked building blocks to form an infrastructure capable of soil interaction.

* * * * *